Patented Dec. 9, 1952

2,621,181

UNITED STATES PATENT OFFICE 2,621,181

STEROID ADDUCTS

Paul E. Marlatt, Arthur R. Hanze, A Vern McIntosh, Jr., and Robert H. Levin, Kalamazoo, Mich., assignors to The Upjohn Company, Kalamazoo, Mich., a corporation of Michigan No Drawing. Application September 15, 1951, Serial No. 246,863

12 Claims. (Cl. 260—239.57)

1

The present invention relates to a novel process for the preparation of certain steroid adducts, and to the novel products produced by the said process. This application is a continuation-in-part of our prior-filed application Serial 187,364, filed September 28, 1950, now Patent No. 2,582,263, and 211,442, filed February 16, 1951.

The novel compounds of the present invention are 9-hydroxy-5,7-pregnadien-20-one 5,8-maleic adduct 9-hydroxy lactones of the formula:

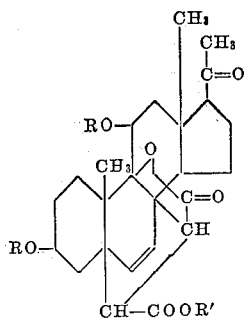

wherein R is hydrogen or an acyl group which is the residue of an organic monocarboxylic acid containing from one to eight carbon atoms, inclusive, and wherein R' is hydrogen or lower-alkyl.

It is an object of the present invention to provide a novel group of compounds which are useful in the preparation of physiologically active steroid compounds containing an oxygen atom at carbon atom eleven. Another object of the present invention is the provision of a process for the production of the novel compounds, 9-hydroxy-5,7-pregnadien-20-one 5,8-maleic adduct 9-hydroxy lactones. Other objects of the invention will be apparent to one skilled in the art to which this invention pertains.

The compounds of the present invention, as previously stated, are useful in the preparation of physiologically active steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, as well as their transformation products. The importance of such investigation is moreover emphasized by the acute shortage of adrenal cortical hormones, and the absence of any present suggestion for alleviation of the said shortage except through organic synthesis.

The compounds of the present invention are prepared by the lactonization of a 9-hydroxy-

2

5,7-pregnadien-20-one maleic 5,8-adduct of the formula:

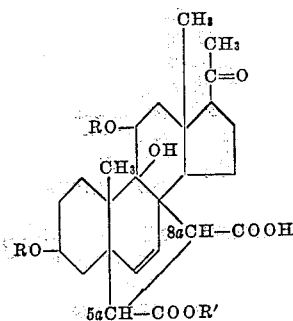

wherein R is hydrogen or acyl which is the residue of an organic monocarboxylic acid, especially such acids containing from one to eight carbon atoms, inclusive, and wherein R' is selected from hydrogen and lower-alkyl, preferably a lower-alkyl group containing from one to eight carbon atoms, inclusive, by dehydrating the starting 9-hydroxy steroid adduct to cause splitting out of one molecule of water between the 8a-carboxy group and the 9-hydroxy group with consequent production of a 9-hydroxy lactone. The manner in which the dehydration is effected is capable of wide variation, as long as the requisite molecule of water be split out to form the desired lactone. For example, the dehydration may be effected by heating the starting adduct, preferably, though not necessarily in an anhydrous organic solvent. Alternatively, the dehydration may be effected by mixing the starting adduct with the anhydride of an organic acid, preferably an aliphatic acid such as formic, acetic, propionic, butyric, octanoic, or benzoic acid, or the like, and preferably, though not necessarily, in the presence of a small amount of basic catalyst such as anhydrous pyridine. As still a further method of effecting the dehydration, the starting adduct may be mixed with a lower-aliphatic alcohol, e. g., an alkanol such as methyl alcohol, ethyl alcohol, propyl alcohol, isopropyl alcohol, n-octyl alcohol, or benzyl alcohol, or the like. The aforementioned substances, i. e., alcohols or anhydrides, apparently have sufficient hygroscopicity to take up one molecule of water from the starting adduct, with consequent formation of the desired lactone, even though merely allowed to stand in admixture with the starting adduct at room temperature or lower, without heating. Of course, it is usually preferred to employ heating to effect the dehydration as this is the most simple procedure, and in some instances, starting with a 3,9,11-trihydroxy adduct, for example, the lactonization procedure can be combined with an acylation procedure, using, of course, sufficient acid anhydride to acylate the 3 and 11 hydroxy groups in addition to the amount required to close the lactone ring. Moreover, the lactone of a maleic acid adduct may be esterified by conventional procedure, e. g., by reaction with a diazoalkane such as diazomethane, diazoethane, diazobutane, or the like, or even with employment of an excess of alcohol in the same reaction which is first productive of the lactone from the 9-hydroxy maleic acid adduct. Thus, a 3,9 11-trihydroxy maleic acid adduct may be converted to a 3,11-dihydroxy lactone acid by heating, to a lactone 3,11-diacyloxy acid by reaction with an acid anhydride, or a 3,11-dihydroxy lactone acid ester by reaction with an excess of an anhydrous alcohol. Correspondingly, a starting 3,11-diacyloxy acid or acid ester can be converted to the lactone by heating, by reaction with an acid anhydride, or by reaction with an anhydrous alcohol, in which latter case the 3,11-diacyloxy acid may be converted to the 3.11-diacyloxy lactone acid ester. The 3,9,11-trihydroxy acid ester adducts may be dehydrated by heat, by reaction with an anhydrous alcohol, or by reaction with an acid anhydride, in which case, if an excess of anhydride is used, the 3,11-hydroxy groups may also be acylated.

The starting 3,9,11-trihydroxy-5,7-pregnadien-20-one maleic acid 5,8 adduct is obtained from a 3,9,11-triacyloxy-5,7-pregnadien-20-one maleic anhydride adduct by careful saponification with about five molar equivalents of a suitable alkali metal base and neutralization with an aqueous mineral acid, as more fully set out in U. S. application Serial 211,442, filed February 16, 1951.

These 3.9,11-triacyloxy-5,7-pregnadien-20-one adducts are obtained by acylation of a 3-hydroxy or 3 - acyloxy - 9,11 - oxido - 5,7 - pregnadien-20-one maleic adduct, as more fully set out in U. S. application Serial 187,364, filed September 28, 1950.

The 3-substituted-9,11-oxido-5,7-pregnadien-20-one adducts are prepared by epoxidation of the 9,11-double bond of a 3-substituted-5,7,9(11) - pregnatrien-20-one adduct, as more fully disclosed in U. S. application Serial 177,966, filed August 5, 1950.

The 3-substituted-5,7.9(11)-pregnatrien-20-one adducts are conveniently prepared by the selective oxidation of a 22-enol ester of an adduct of 3 - acyloxybisnor - 5,7,9(11) - cholatrien - 22 - al, as more fully disclosed in U. S. application Serial 121,224, filed October 13, 1949.

Adducts of 3,22-diacyloxybisnor-5,7,9(11)20-(22)-cholatetraenes [22-enol esters of 3-acyloxybisnor-5,7.9(11)-cholatrien-22-als] are conveniently prepared by subjecting an adduct of a 3-acyloxybisnor-5,7.9(11)-cholatrien-22-al to the action of an acid anhydride or an acid halide in the presence of an alkaline salt of the acid, as more fully disclosed in U. S. application Serial 111,974, filed August 23, 1949.

The starting adducts of 3-acyloxybisnor-5,7,9-(11)-cholatrien-22-als can be prepared from adducts of 3-esters of dehydroergosterol by selective oxidation as more fully disclosed in U. S. application Serial 111,100, filed August 18, 1949.

The following examples are illustrative of the process and products of the present invention, but are not to be construed as limiting.

PREPARATION 1.—DIMETHYL MALEATE ADDUCT OF 3-BETA-ACETOXY-9,11-OXIDO-5,7-PREGNADIEN-20-ONE

One gram (0.002 mole) of the dimethyl maleate adduct of 3-beta-acetoxy-5,7,9(11)-pregnatrien-20-one was dissolved in 25 milliliters of glacial acetic acid, and a solution of one milliliter of thirty percent hydrogen peroxide (four molar equivalents) in six milliliters of glacial acetic acid was added thereto at room temperature. The reaction mixture was heated on the steam bath for four hours and thereafter allowed to stand at room temperature overnight. The mixture was then poured into 300 milliliters of water, the resulting precipitate separated by filtration, washed with water, and dried. The yield was 810 milligrams of the oxido compound melting at 197–206 degrees centigrade. After five recrystallizations from methanol and acetone-hexane, the dimethyl maleate adduct of 3-beta-acetoxy-9,11-oxido-5,7-pregnadien-20-one melted at 216–221 degrees centigrade, [alpha]$_D^{26}$+11.4 degrees (chloroform).

Analysis:
Calculated per cent C, 67.68; per cent H, 7.44
Found____ per cent C, 67.74; per cent H, 7.35
68.02; 7.49

PREPARATION 2.—MALEIC ANHYDRIDE ADDUCT OF 3-BETA-ACETOXY-9,11-OXIDO-5,7-PREGNADIEN-20-ONE

Five grams (0.011 mole) of the maleic anhydride adduct of 3-beta-acetoxy-5,7,9(11)-pregnatrien-20-one was dissolved in 120 milliliters of hot glacial acetic acid, the solution thereafter cooled to room temperature, and a solution of five milliliters of thirty percent hydrogen peroxide (four molar equivalents) in thirty milliliters of glacial acetic acid added dropwise thereto with swirling. The reaction mixture was heated on the steam bath for three and one-half hours. The colorless solution was allowed to stand at room temperature overnight, poured into about one liter of water, the resulting precipitate separated by filtration, washed with water, and dried in a vacuum desiccator. The yield was 4.88 grams (94.8 percent), melting at 232–246 degrees centigrade. After two recrystallizations from acetone, crystals of the maleic anhydride adduct of 3-beta-acetoxy-9,11-oxido-5,7-pregnadien-20-one, melting at 240–246 degrees centigrade, were obtained.

Analysis:
Calculated per cent C, 69.21; per cent H, 6.89
Found____ per cent C, 69.43; per cent H, 6.94
69.30; 6.97

PREPARATION 3.—MALEIC ANHYDRIDE ADDUCT OF 3-BETA-ACETOXY-9,11-OXIDO-5,7-PREGNADIEN-20-ONE

A solution of fifty grams of the maleic anhydride adduct of 3-beta-acetoxy-5,7,9(11)-pregnatrien-20-one in 1200 milliliters of glacial acetic acid was prepared by heating the ingredients together on a steam bath. The mixture was then cooled below forty degrees centigrade and fifty milliliters of thirty percent hydrogen peroxide in 300 milliliters of glacial acetic acid added thereto. The mixture was then heated on the steam bath for one hour at a temperature of 85 degrees centigrade or above, and was then poured into three to five volumes of ice and water. The yield was 47.7 grams (92 percent), melting point 238–243 degrees centigrade, [alpha]$_D^{25}$+31.1 degrees (chloroform). The product was dissolved in methylene chloride and precipitated by addition of ether to give 37.7 grams of purified product having a melting point of 254 to 259 degrees centigrade, [alpha]$_D^{25}$+33.2 degrees (chloroform).

PREPARATION 4

In the same manner as given above for the preparation of 3-beta-acetoxy-9,11-oxido-5,7-pregnadien-20-one maleic anhydride adduct, the following compounds were prepared:

(1) Maleic anhydride adduct of 3-benzoyloxy-9,11-oxido-5,7-pregnadien-20-one, M. P. 258–260 degrees centigrade, $[alpha]_D^{26}+24.4$ degrees (chloroform).

Analysis:
Calculated per cent C, 72.43; per cent H, 6.46
Found____ per cent C, 72.62; per cent H, 6.42
                                72.70;                 6.38

(2) Maleic anhydride adduct of 3-heptanoyloxy-9,11-oxido-5,7-pregnadien-20-one, M. P. 168–169.5 degrees centigrade, $[alpha]_D^{26}+26.1$ degrees (chloroform).

Analysis:
Calculated per cent C, 71.48; per cent H, 7.69
Found____ per cent C, 71.27; per cent H, 7.43
                                71.44;                 7.65

PREPARATION 5.—MALEIC ACID ADDUCT OF 3-BETA-HYDROXY-9,11-OXIDO-5,7-PREGNADIEN-20-ONE

Approximately 445 milliliters of five percent sodium hydroxide solution was added to 22.26 grams of 3-beta-acetoxy-9,11-oxido-5,7-pregnadien-20-one maleic anhydride adduct in a one-liter Erlenmeyer flask, and the mixture stirred until the solid had gone into solution. About 185 milliliters of ten percent hydrochloric acid was then added at room temperature or below, until the mixture was acid to Congo red paper, whereupon the hydroxy diacid began to precipitate. Upon cooling the flask overnight, filtering and air-drying the product at room temperature, a yield of 19.4 grams of desired 3-beta-hydroxy-9,11-oxido-5,7-pregnadien-20-one maleic acid adduct, melting at 229–233 degrees centigrade with decomposition, was obtained. An additional crop of crystals was obtained by concentration of the mother liquor.

PREPARATION 6.—MALEIC ANHYDRIDE ADDUCT OF 3-BETA-HYDROXY-9,11-OXIDO-5,7-PREGNADIEN-20-ONE 3-beta-hydroxy-9,11-oxido-5,7-pregnadien-20-one maleic acid adduct (19.4 grams) was placed in a vacuum oven and heated for ten hours at 137–140 degrees centigrade under a pressure of only one-half millimeter of mercury. The yield of desired anhydride, which melts at 233 to 240 degrees centigrade with decomposition, was quantitative.

PREPARATION 7.—MONOMETHYL MALEATE OF 3-BETA-HYDROXY-9,11-OXIDO-5,7-PREGNADIEN-20-ONE

A solution of five grams of the maleic anhydride adduct of 3-beta-acetoxy-9,11-oxido-5,7-pregnadien-20-one in 145 milliliters of methanol and a solution of five grams of sodium hydroxide in 25 milliliters of water were mixed and the mixture allowed to stand for one hour, whereafter 145 milliliters of water was added, the mixture allowed to stand for seven hours, then made acid with three normal hydrochloric acid and placed in the refrigerator. The mixture was then extracted with methylene chloride, washed with sodium chloride, and dried over sodium sulfate. The yield was 4.93 grams, melting point 130–160 degrees centigrade. After recrystallization three times from a solution of chloroform, methanol, and ether, the melting point was 193–198 degrees centigrade, $[alpha]_D^{25}+19.4$ degrees (chloroform).

Analysis:

|  | Per cent C | Per cent H | Per cent OCH$_3$ |
|---|---|---|---|
| Calculated | 68.10 | 7.47 | 6.76 |
| Found | 67.90 | 7.14 | 6.22 |
|  | 67.97 | 7.35 | 6.12 |

PREPARATION 8.—DIMETHYL MALEATE OF 3-BETA-HYDROXY-9,11-OXIDO-5,7-PREGNADIEN-20-ONE

A suspension of 0.65 gram of the monomethyl ester of the maleic acid adduct of 3-beta-hydroxy-9,11-oxido-5,7-pregnadien-20-one in twenty milliliters of anhydrous ether was treated with an excess of diazomethane in methylene chloride solution. On addition of methylene chloride the compound went into solution and was allowed to stand about two hours, the solution evaporated to dryness, and the residue dissolved in twelve milliliters of hot ethanol, filtered, concentrated, water added, and the solution placed in the refrigerator. The precipitate was separated by filtration to give a yield of 0.54 gram, melting at 207–211 degrees centigrade. The product was passed over a column of alumina for purification, and this procedure yielded 0.50 gram of product, which upon crystallization from methanol had a melting point of 210–212 degrees centigrade, $[alpha]_D^{25}+15.4$ degrees (chloroform).

Analysis:

|  | Per cent C | Per cent H | Per cent OCH$_3$ |
|---|---|---|---|
| Calculated | 68.62 | 7.68 | 13.13 |
| Found | 68.62 | 7.61 | 12.10 |
|  | 68.61 | 7.64 | 12.22 |

Infrared analysis was in agreement with the structure proposed.

PREPARATION 9.—3,9,11-TRIACETOXY-5,7-PREGNADIEN-20-ONE MALEIC ANHYDRIDE ADDUCT

To a one-liter three-neck round-bottom flask equipped with stirrer and thermometer, immersed in an ice-salt bath, were added eight grams of 3-beta-acetoxy-9,11-oxido-5,7-pregnadien-20-one maleic anhydride adduct and 400 milliliters of acetic anhydride (Merck reagent grade). After solution was complete and after the inside temperature had dropped to between zero and four degrees centigrade, sixteen drops of anhydrous stannic chloride was added thereto. The reaction was allowed to continue for 45 minutes with stirring, and, at the end of this time, the reaction mixture was poured into three liters of ice and water. The ice and water mixture was stirred until all of the acetic anhydride had hydrolyzed and the product had precipitated as white platelets. The white product was filtered off and dried. The weight was 9.42 grams, M. P. 205–215 degrees centigrade. Two recrystallizations from acetone-isopropyl ether mixture gave 4.2 grams, M. P. 228–234 degrees centigrade (tube), 265–270 degrees centigrade with softening at 235 degrees centigrade (block); $[alpha]_D^{27}-84.7$ degrees (chloroform). The yield was 43 percent.

Analysis:
Calculated _____ C, 65.24; H, 6.71
Found _____ C, 65.26; H, 6.72
                                              65.26;   6.72

PREPARATION 10.—3-BENZOYLOXY-9,11-DIACETOXY-5,7-PREGNADIEN-20-ONE MALEIC ANHYDRIDE ADDUCT

In exactly the same manner as given in Preparation 9, this compound is prepared from 3-benzoyloxy-9,11-oxido-5,7-pregnadien-20-one maleic anhydride adduct (Preparation 4).

PREPARATION 11. — 3-HEPTANOYLOXY-9,11-DIACETOXY-5,7-PREGNADIEN-20-ONE MALEIC ANHYDRIDE ADDUCT

In exactly the same manner as given in Preparation 9, this compound is prepared from 3-heptanoyloxy-9-11-oxido-5,7-pregnadien-20-one maleic anhydride adduct (Preparation 4).

PREPARATION 12.—3,9,11-TRIACETOXY-5,7-PREGNADIEN-20-ONE DIMETHYL MALEATE ADDUCT

In exactly the same manner as given in Preparation 9, this compound is prepared from 3-acetoxy-9,11-oxido-5,7-pregnadien-20-one dimethyl maleate adduct (Preparation 1).

PREPARATION 13.—3-ACETOXY-9,11-DIPROPIONOXY-5,7-PREGNADIEN-20-ONE MALEIC ANHYDRIDE ADDUCT

In exactly the same manner as given in Preparation 9, this compound is prepared from 3-acetoxy-9,11-oxido-5,7-pregnadien-20-one maleic anhydride adduct using an excess of propionic anhydride and stannic chloride catalyst.

PREPARATION 14.—3,9,11-TRIHYDROXY-5,7-PREGNADIEN-20-ONE MALEIC ACID ADDUCT DISODIUM SALT

The maleic anhydride adduct of 3-beta-9,11-triacetoxy-5,7-pregnadien-20-one (11.05 grams) was dissolved in 200 milliliters of purified dioxane by heating. To this solution was added 250 milliliters of two normal sodium hydroxide solution at room temperature and the mixture diluted with an additional fifty milliliters of water, making approximately a one normal solution of sodium hydroxide. This was allowed to stand at room temperature for two hours, at the end of which time formation of the 3,9,11-trihydroxy-5,7-pregnadien-20-one maleic acid adduct disodium salt was complete. Use of potassium hydroxide in place of sodium hydroxide is productive of the dipotassium salt.

PREPARATION 15.—3,9,11-TRIHYDROXY-5,7-PREGNADIEN-20-ONE 5,8-MALEIC ACID ADDUCT

The reaction mixture from Preparation 14 was partially neutralized by addition of 100 milliliters of three normal hydrochloric acid and then evaporated in vacuo at forty degrees centigrade to a volume of 310 milliliters, thereby removing all dioxane. The reaction mixture was then made acid to Congo red paper by adding eighty milliliters of three normal hydrochloric acid and placed in the refrigerator for several hours. The yield of crude product was 71.5 percent. This was redissolved in forty milliliters of 0.5 normal sodium hydroxide, diluted to 200 milliliters with water, made acid with 45 milliliters of one normal hydrochloric acid, and cooled. The yield was 5.62 grams of white needles, M. P. 255–264 degrees centigrade.

*Example 1.—3,11 - diacetoxy - 9 - hydroxy-5,7-pregnadien-20-one 5,8-maleic acid adduct 9-hydroxy lactone*

3,9,11-trihydroxy-5,7-pregnadien-20-one maleic acid adduct was dissolved in twenty milliliters of acetic anhydride and one drop of dry pyridine was added as catalyst. The solution was allowed to stand at room temperature for fifteen hours. In the process of isolation the product was taken to dryness under vacuum at steam bath temperature (eighty degrees centigrade) and redissolved in an organic solvent. From this solvent an amorphous solid was obtained. Infra red studies on this material established the structure as that of 3,11-diacetoxy-9-hydroxy-5,7-pregnadien-20-one maleic acid adduct 9-hydroxy lactone.

In the same manner, by use of other organic monocarboxylic acid anhydrides, such as propionic, butyric, valeric, hexanoic, heptanoic, octanoic, and benzoic, in place of acetic anhydride, the corresponding 3,11-dipropionoxy, 3,11-dibutyroxy, 3,11-divaleroyloxy, 3,11-dihexanoyloxy, 3,11-diheptanoyloxy, 3,11-dioctanoyloxy, 3,11-dibenzoyloxy, and like 3,11-diacyloxy-9-hydroxy-5,7-pregnadien-20-one 5,8-maleic acid adduct 9-hydroxy lactones are produced. The reaction is believed to proceed through the intermediate 3,11-diacyl-9-hydroxy compound, of the formula:

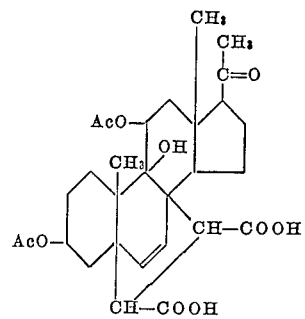

due to the relative ease of acylation attributable to the 3 and 11 hydroxy groups due to lack of steric hindrance in these positions as contrasted with the 9 position, and the general relative difficulty of lactone formation. The fact that the 11-hydroxy group undergoes acylation indicates it to have the alpha configuration, since known 11-beta-hydroxy steroids do not undergo acylation.

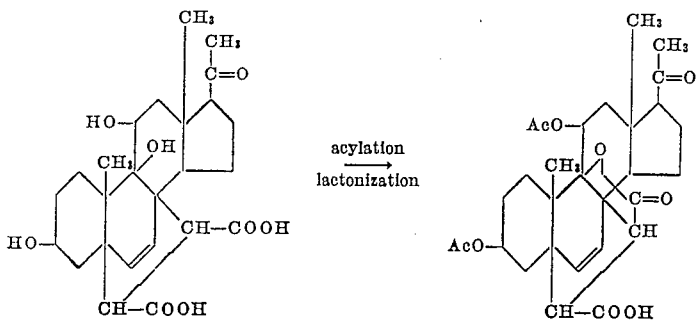

Example 2.—3,9,11-trihydroxy-5,7-pregnadien-20-one 5,8-maleic acid adduct 9-hydroxy lactone

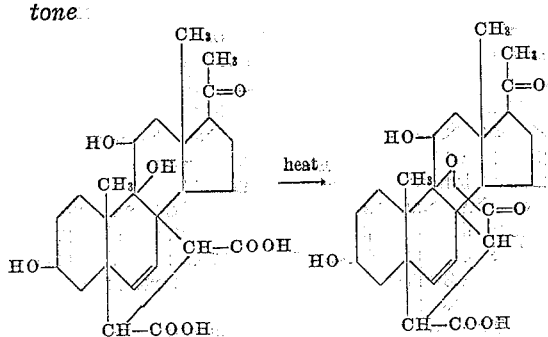

3,9,11-trihydroxy-5,7-pregnadien-20-one 5,8-maleic acid adduct (from Preparation 15) was dissolved in twenty milliliters of anhydrous diethyl ether and the mixture heated at about reflux temperature (35 degrees centigrade) for a period of about two hours. Excess ether was then removed by evaporation and remaining solvent taken off under vacuum, leaving a white solid identified by infra red spectrum as 3,9,11-trihydroxy-5,7-pregnadien-20-one 5,8-maleic acid adduct 9-hydroxy lactone. The structure of this solid was proved by acetylation with acetyl chloride to give 3,11-diacetoxy-9-hydroxy-5,7-pregnadien-20-one 5,8-maleic acid adduct 9-hydroxy lactone, which had an infra red spectrum identical with that produced by the same compound obtained in the manner of Example 1.

This compound, 3,9,11-trihydroxy-5,7-pregnadien-20-one 5,8-maleic acid adduct 9-hydroxy lactone, can also be converted to other 3,11-diacyloxy-9-hydroxy-5,7-pregnadien-20-one 5,8-maleic acid adduct 9-hydroxy lactones, such as the 3-11-diformoxy, 3,11-dipropionoxy, 3,11-dibutyroyloxy, 3,11-divaleroyloxy, 3,11-dihexanoyloxy, 3,11-diheptanoyloxy, 3,11-dioctanoyloxy, 3,11-dibenzoyloxy, and like 3,11-diacyloxy-5,7-pregnadien-20-one 5,8-maleic acid adduct 9-hydroxy lactones, by reaction with about two moles of the selected acyl chloride, preferably using pyridine or other basic catalyst, or in other conventional manners. The 3,9,11-trihydroxy-5,7-pregnadien-20-one 5,8-maleic acid adduct 9-hydroxy lactone can also be converted into esters thereof by esterification at the carboxy group using a diazoalkane, e. g., diazomethane, diazoethane, diazopropane, diazobutane, or in other conventional manner, such as with an alcohol, e. g., methyl alcohol, ethyl alcohol, propyl alcohol, isopropyl alcohol, butyl alcohol, pentyl alcohol, hexyl alcohol, heptyl alcohol, octyl alcohol, benzyl alcohol, or the like. Alternatively, the trihydroxy acid may be both acylated and esterified, if desired, in the manner outlined above, either of the two possible sequences being satisfactory.

To a solution of 3,9,11-trihydroxy-5,7-pregnadien-20-one 5,8-maleic acid adduct (6.48 grams, 0.014 mole) in 100 milliliters of methanol, immersed in an ice bath, was added portion-wise over a period of one-half hour 350 milliliters (an excess) of a methylene chloride solution of diazomethane. The reaction was allowed to stand overnight at room temperature and excess diazomethane then boiled off on a steam bath under the hood. The remaining solvent was taken off under vacuum, leaving 6.27 grams of a white solid, the infra red spectrum of which indicated it to be the desired 3,9,11-trihydroxy-5,7-pregnadien-20-one 5,8-maleic acid monomethyl ester adduct 9-hydroxy lactone.

The dehydration may be accomplished in the same manner, by employment of other alkanols, such as ethyl alcohol, propyl alcohol, isopropyl alcohol, butyl alcohol, pentyl alcohol, hexyl alcohol, heptyl alcohol, octyl alcohol, or benzyl alcohol, and the like, instead of the methyl alcohol used in the example. Likewise, other esterifying agents such as diazoethane, diazopropane, diazobutane, diazooctane, and the like may be used as esterifying agents, or, alternatively, the starting 3,9,11-trihydroxy acid may merely be heated together with the desired alcohol, such as those mentioned above, to effect both esterification and lactonization, the esterification in such case, as in the example, apparently taking place first and lactonization occurring due to presence of alcohol and/or subsequent heating.

The 3,9,11-trihydroxy-5,7-pregnadien-20-one, 5,8-maleic acid monoalkyl ester adduct 9-hydroxy lactones may be acylated according to the procedures outlined for acylation of 3,9,11-trihydroxy-5,7-pregnadien-20-one 5,8-maleic acid adduct 9-hydroxy lactone in Example 2 supra, or the 3,11-diacyloxy-9-hydroxy-5,7-pregnadien-20-one 5,8-maleic acid adduct 9-hydroxy lactones of Example 1 may be esterified using a diazoalkane or an alcohol to yield the same products, in each case a 3,11-diacyloxy-9-hydroxy-5,7-pregnadien-20-one 5,8-maleic acid monoalkyl ester adduct 9-hydroxy lactone.

It is to be understood that the invention is not to be limited to the exact details of operation or exact compounds shown and described, as obvious modifications and equivalents will be apparent to one skilled in the art, and the invention is therefore to be limited only by the scope of the appended claims.

Example 3.—3,9,11-trihydroxy-5,7-pregnadien-20-one 5,8-maleic acid monomethyl ester adduct 9-hydroxy lactone

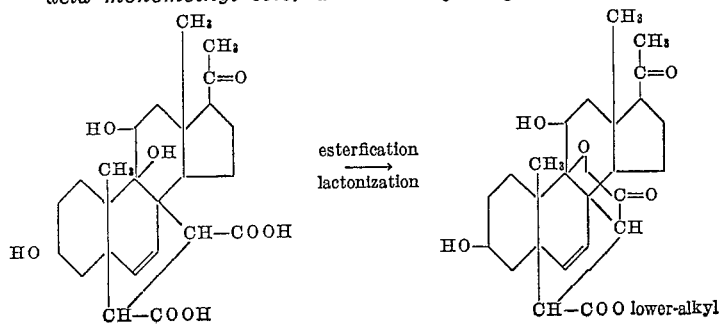

We claim:

1. A 9-hydroxy-5,7-pregnadien-20-one 5,8-maleic adduct 9-hydroxy lactone of the formula:

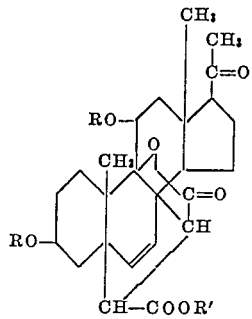

wherein R is selected from the group consisting of hydrogen and an acyl group $R_1CO—$, wherein $R_1$ is selected from hydrogen and a hydrocarbon radical containing from one to seven carbon atoms, inclusive, and $R^1$ is selected from the group consisting of hydrogen and a lower-alkyl group containing from one to eight carbon atoms, inclusive.

2. 3,11-diacetoxy-9-hydroxy-5,7-pregnadien-20-one 5,8-maleic acid adduct 9-hydroxy lactone.

3. 3,9,11-trihydroxy-5,7-pregnadien-20-one 5,8-maleic acid adduct 9-hydroxy lactone.

4. 3,9,11-trihydroxy-5,7-pregnadien-20-one 5,8-maleic acid monomethyl ester adduct 9-hydroxy lactone.

5. The process for the production of a steroid adduct 9-hydroxy lactone which comprises: lactonizing a starting 9-hydroxy-5,7-pregnadien-20-one maleic 5,8-adduct of the formula:

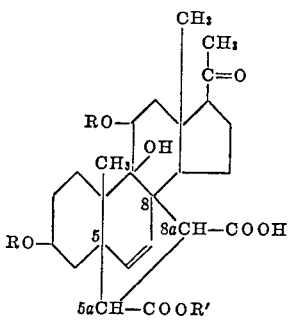

wherein R is selected from the group consisting of hydrogen and $R_1CO—$, wherein $R_1$ is selected from hydrogen and a hydrocarbon radical containing from one to seven carbon atoms, inclusive, and wherein $R^1$ is selected from hydrogen and lower-alkyl, by dehydrating the starting 9-hydroxy steroid adduct to cause splitting out of one molecule of water between the 8a-carboxy group and the 9-hydroxy group with consequent production of a 9-hydroxy lactone.

6. The process of claim 5, wherein the dehydration is effected by heating the starting adduct.

7. The process of claim 5, wherein the dehydration is effected by mixing the starting adduct with an alkanol.

8. The process of claim 5, wherein the dehydration is effected by mixing the starting adduct with an aliphatic acid anhydride.

9. The process of claim 5, wherein the starting adduct is 3,9,11-trihydroxy-5,7-pregnadien-20-one maleic acid 5,8-adduct.

10. The process of claim 5, wherein the starting adduct is 3,9,11-trihydroxy-5,7-pregnadien-20-one maleic acid 5,8-adduct and the dehydration is effected by heating.

11. The process of claim 5, wherein the starting adduct is 3,11-diacetoxy-9-hydroxy-5,7-pregnadien-20-one maleic acid 5,8-adduct.

12. The process of claim 5, wherein the starting adduct is 3,9,11-trihydroxy-5,7-pregnadien-20-one maleic acid monomethyl ester 5,8-adduct.

PAUL E. MARLATT.
ARTHUR R. HANZE.
A VERN McINTOSH, Jr.
ROBERT H. LEVIN.

No references cited.